Jan. 15, 1952    E. FENNESSY ET AL    2,582,588
TRACK CONTROL UNIT
Filed Aug. 11, 1947    4 Sheets-Sheet 1

INVENTORS:—
RAYMOND CALVERT
EDWARD FENNESSY
GRAHAM E. ROBERTS
BY Walter P. Huntley
ATTORNEY

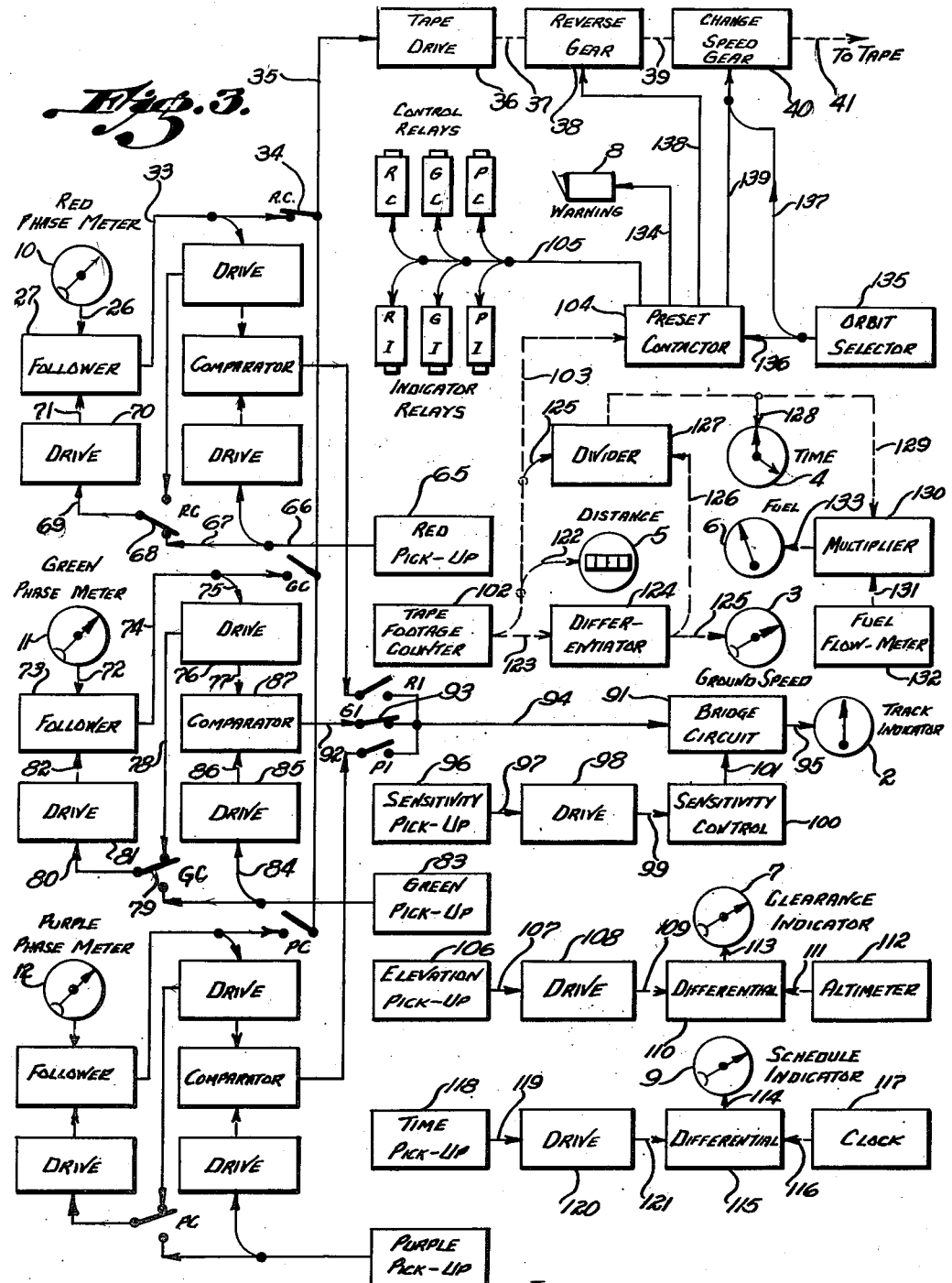

Jan. 15, 1952 E. FENNESSY ET AL 2,582,588
TRACK CONTROL UNIT
Filed Aug. 11, 1947 4 Sheets-Sheet 3
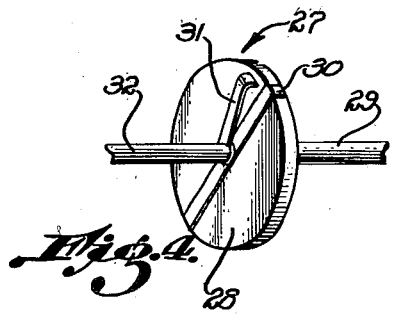
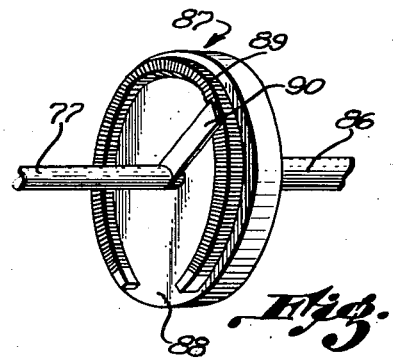
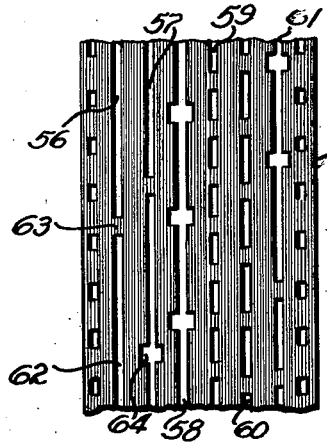
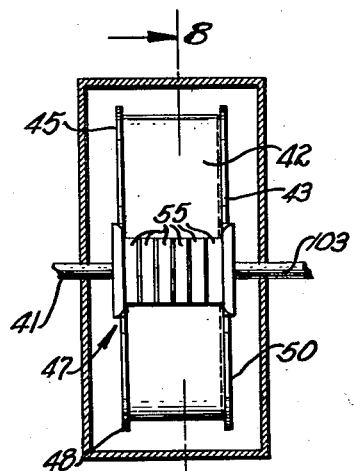
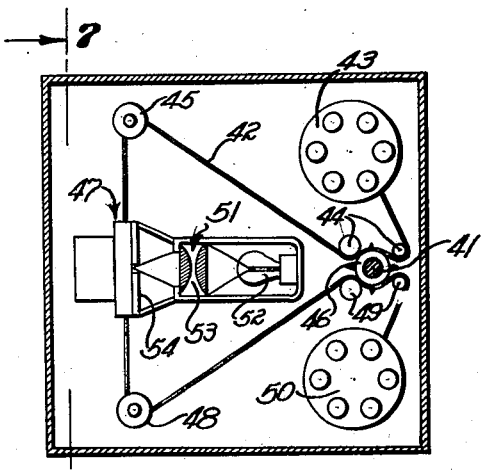
INVENTORS:- RAYMOND CALVERT
EDWARD FENNESY
GRAHAM E. ROBERTS
BY
ATTORNEY Jan. 15, 1952  E. FENNESSY ET AL  2,582,588
TRACK CONTROL UNIT
Filed Aug. 11, 1947  4 Sheets-Sheet 4
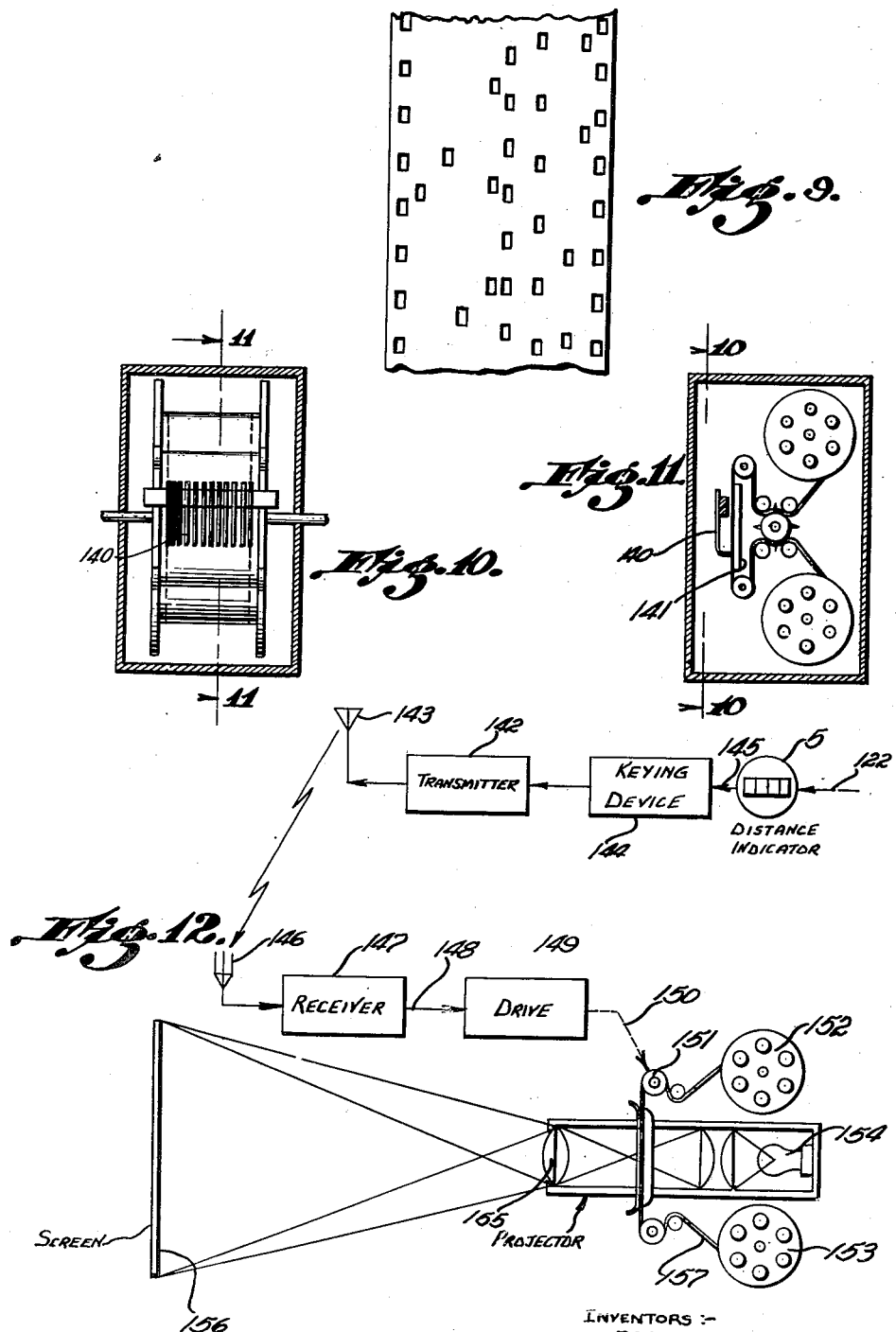

Patented Jan. 15, 1952

2,582,588

UNITED STATES PATENT OFFICE 2,582,588

TRACK CONTROL UNIT

Edward Fennessy, Orpington, Graham E. Roberts, Stoneleigh, and Raymond Calvert, New Malden, England Application August 11, 1947, Serial No. 767,872
In Great Britain August 12, 1946

9 Claims. (Cl. 250—2)

1

This invention relates to track control units and has particular reference to an apparatus for use with radio frequency navigational systems for indicating continuously the relation between the existing and planned parameters of a journey of a mobile vehicle.

The radio navigational system are (as exemplified by the German Patent No. 546,000 to M. Harms, and United States Patents No. 2,408,773 to W. M. Goodall; and No. 2,530,903 to William J. O'Brien assigned to the assignee of this application) has been brought to that state of perfection which permits the pilot or navigator of a mobile vehicle to determine his position with precision at any time merely by reading two position indicators and plotting the readings on his chart. With respect to planned journeys, this leaves the problem of determining the relation between the determined position and that corresponding to the predetermined plan and requires a decision to be made as to how best to reduce any disparity between the two. In the case of aircraft, particularly when the responsibility for navigation is placed on the pilot, these additional operations are a considerable burden.

Furthermore, because of the high speed of the aircraft and the resulting high rate at which the position of the aircraft changes, these determinations are never current but instead reveal the circumstances that used to exist, thus requiring the extrapolation of the trend to arrive at what is at best only an estimate of the current situation.

Finally, the process described discloses at most the relation between the parameters of position in a horizontal plane and leaves completely undetermined the relations between the parameters of position in the vertical plane, the scheduled times, and the rates of change of these parameters.

It is therefore an object of this invention to provide a track control unit for use with radio navigational aid systems which indicates continuously the relation between the existing and planned parameters of a journey of a mobile vehicle.

It is another object of this invention to provide a track control unit of the character set forth in the preceding paragraph which includes means controlled by the navigational aid for indicating the difference between the planned and measured values of each of a number of parameters at the instant of identity of the measured value of another parameter with the planned value thereof.

2

It is an additional object of this invention to provide a track control unit of the character hereinbefore described which includes a recording medium upon which is carried successive planned or predetermined values of each of a group of parameters together with means for comparing the recorded values with the measured values.

It is also an object of this invention to provide a track control unit of the character set forth in the preceding paragraph in which the comparisons are made each time the measured value of a selected one of said parameters agrees with the planned value thereof.

The present invention also finds considerable utility as an aid to traffic control and despatching problems. Before this invention, the control officers at airports and harbours were able to locate and plot the progress of ships en route only by the use of radar at short range and by direct radio communication at longer range. The latter arrangement was very unsatisfactory because the position of the ship was ascertained only at infrequent intervals.

It is therefore a still further object of this invention to provide at a fixed location an indicating device which is coupled to the aforementioned track control unit by a radio link and which operates to indicate continuously the progress of the mobile vehicle along the planned route.

It is also an object of this invention to provide a track control unit of the character set forth in the preceding paragraph in which the indication is presented in the form of an index which moves over a chart or map in correspondence with the movement of the mobile vehicle along the planned course.

Other objects and advantages of this invention will be apparent from a study of the following specification read in connection with the accompanying drawings, wherein:

Figure 3 is a block diagram of the track control unit illustrating its construction and mode of operation;

Figure 4 is a perspective view illustrating the construction of a follower device forming a part of the apparatus shown in Figure 3;

Figure 5 is a perspective view of a comparator device forming a part of the apparatus shown in Figure 3;

Figure 6 is a diagrammatic representation of a portion of one type of recording medium used with the track control unit;

Figure 7 is a cross sectional view along the line VII—VII of Figure 8 illustrating the construction of a pick-up unit used with the recording medium shown in Figure 6;

Figure 8 is a longitudinal sectional view taken along the line VIII—VIII of Figure 7 and showing the apparatus used for controlling the movement of the recording medium and for reproducing the material recorded thereon;

Figure 9 is a view similar to Figure 6 but illustrating a modified form of recording medium;

Figure 10 is a cross sectional view taken substantially along the line X—X of Figure 11 and showing a pick-up unit for use with the recording medium shown in Figure 9;

Figure 11 is a longitudinal view of the device shown in Figure 10 illustrating the apparatus used for controlling the motion of the recording medium; and Figure 12 is a block diagram illustrating the construction and mode of operation of an apparatus for indicating at a fixed location the progress of a mobile vehicle with respect to its planned course.

The problem of precisely executing a planned journey is generally most acute in the case of scheduled flights of aircraft and for this reason this invention is herein described with reference to its use with aircraft. It will be apparent, however, to those skilled in this art that the invention is not limited in its applicability to aircraft but instead is very useful for controlling the navigation of other mobile vehicles such as surface ships making scheduled runs between two ports.

Figure 1:
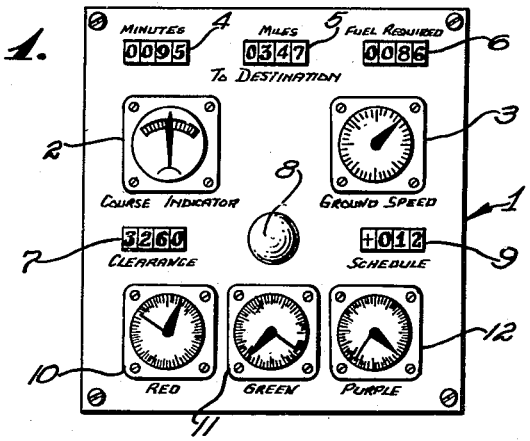
Figure 1 is an elevational view of the instrument panel portion of the track control unit of this invention showing the type of information presented by the device.

Referring to the drawings, Figure 1 illustrates an instrument panel 1 comprising the indicating portion of the track control unit. Upon this panel there may be mounted a course indicator 2, the function of which is to indicate to the pilot or navigator whether the aircraft is proceeding along the planned course, and if not, the direction and magnitude of the departure from the intended course. A ground speed indicator 3 may be provided and there may also be included indicating dials 4, 5 and 6 indicating respectively the time required to reach the destination under the present operating conditions, the distance to the destination and the fuel required to reach the destination at the present rate of travel and fuel consumption. A clearance indicator 7 may be provided for indicating the height of the aircraft with respect to the terrain and a warning device 8 may be included for warning the pilot of the imminent approach of known obstructions such as radio towers, tall buildings, mountain peaks and the like. The time relation between the existing and planned schedule may be indicated by a dial 9 giving the information as to whether or not the aircraft is ahead or behind schedule and how much.

In addition to the foregoing information the panel 1 also preferably supports three co-ordinate indicators 10, 11 and 12 forming a part of a radio navigational aid and indicating the coordinates defining the instantaneous geographical location of the vehicle.

Figure 2:
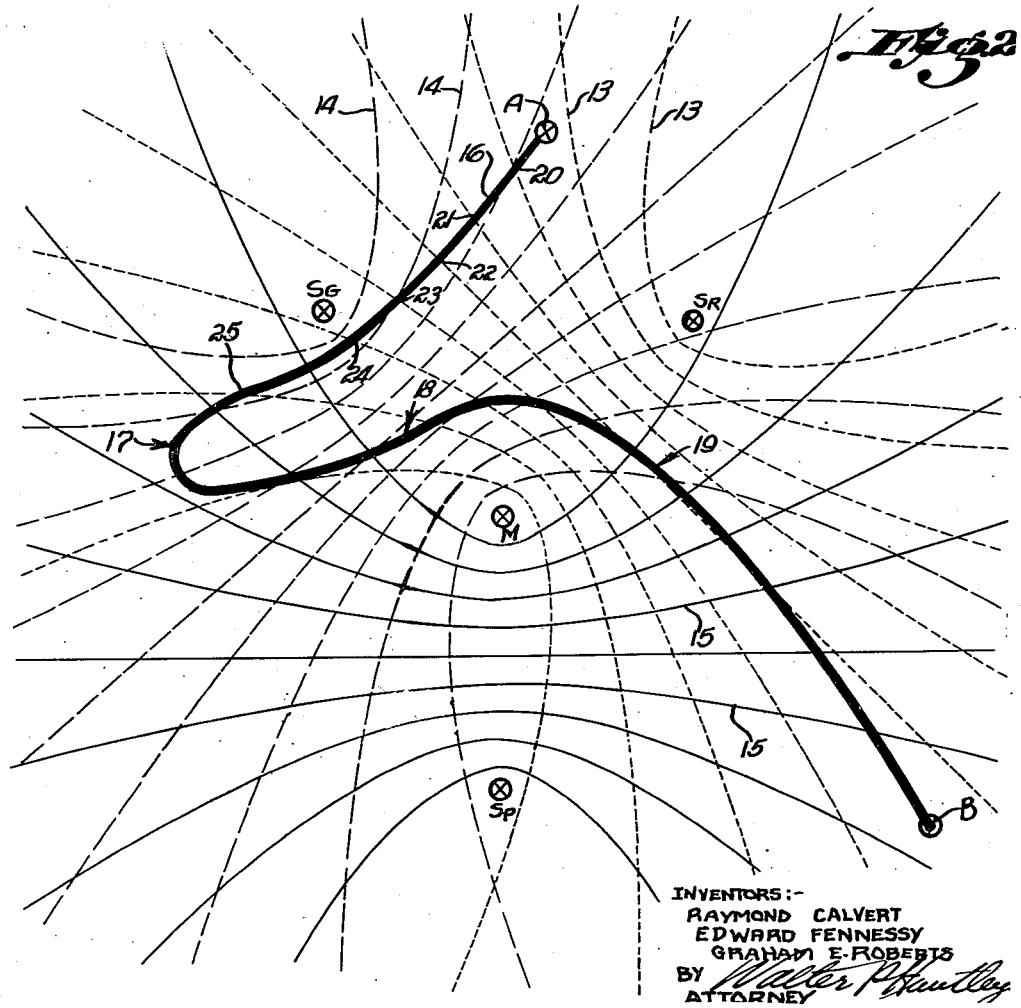
Figure 2 is a diagram illustrating the navigational grid established by an equi-phase displacement navigational system and indicating a hypothetical course to be followed by a mobile vehicle equipped with the track control unit forming the subject matter of this invention.

For the purpose of explanation, the co-ordinate indicators 10, 11 and 12 are assumed to comprise the indicating members of a radio navigational aid of the equi-phase displacement type such as is exemplified by the aforementioned O'Brien Patent No. 2,530,903 and U. S. Patent No. 2,408,773 to W. M. Goodall. Figure 2 illustrates the character of the navigational grid established by such a system, it being understood that a system of the character referred to includes a master transmitter M which cooperates with three slave transmitters $S_R$, $S_G$ and $S_P$. The radiations from master station M and slave station $S_R$ define a hyperbolic equi-phase displacement field pattern such as is represented by the dotted lines 13 in Figure 2, which pattern is hereinafter defined for the purpose of convenience as the Red pattern. Similarly, the master station M and slave station $S_G$ coact to define a hyperbolic pattern such as is represented by the dashed lines 14 and hereinafter defined as the Green pattern. Finally, the master station M and slave station $S_P$ coact to define a purple hyperbolic field pattern such as is represented by the solid lines 15.

In the normal operation of the navigational system the red, green and purple coordinate indicators 10, 11 and 12 operate to define the instantaneous position of the mobile vehicle with respect to the red, green and purple patterns, 13, 14 and 15, it being understood that the respective patterns are numbered with a coordinate numbering system which is reproduced on the corresponding coordinate indicators so that by reading the values indicated on these indicators the position of the mobile vehicle may be determined by plotting these values on the coordinate system represented by the red, green and purple patterns.

The invention will perhaps be best understood by assuming a specific navigational problem and by carrying forward the description of the apparatus and its mode of operation as the assumed problem is executed. For this purpose there has been drawn on Figure 2 a tortuous track or course represented by the heavy line 16 extending from a starting point A to a destination B. The unlikely course configuration has been chosen for the purpose of facilitating the explanation of the various features of the invention.

The course 16 may be considered as consisting of four sections; namely, the part extending from A to the point 17 over which portion the purple pattern is relatively inaccurate; the portion extending from the point 17 to a point 18 over which the red pattern is relatively inaccurate; the portion extending from the point 18 to a point marked 19 during which the purple is relatively inaccurate; and a portion extending from 19 to B over which the green provides a relatively inaccurate cover. The navigation of an aircraft along the course 16 should therefore be based upon the red and green patterns during the first part from A to 17, on the purple and green patterns during the second part from 17 to 18, on the red and green patterns during the third part from 18 to 19, and on the purple and red patterns during the last part from 19 to B.

Considering first the first portion of the course extending from A to 17 it will be seen that the course 16 crosses red coordinate lines 13 at the points marked 20, 21, 22, 23, 24 and 25. The red coordinate lines are crossed more frequently than are the green. It therefore appears that the departure of the vehicle from its intended course can best be determined by measuring at each of the inter-sections 20, 21, 22 etc. the difference between the green co-ordinate value corresponding to the instantaneous location of the aircraft and that corresponding to the intersection of the course 16 with the red coordinate line 13 passing through those points.

To simplify the ensuing description the following terminology has been selected. It may be said that the red coordinate lines are to be used as a basis for "control" and that the green coordinate lines are to be used for "indication"; that is to say, indications of the departure of the vehicle from the intended course are to be given by measuring and indicating the difference between the existing and planned value of the indicating coordinate (green in the assumed case) at the instant of identify between the existing and planned control coordinate (red in the assumed case). Applying this terminology to the remainder of the course it will be seen that from the portion extending from 17 to 18 the purple should be used for control and the green used for indication, while from 18 to 19 the red should be used for control and the green used for indication, and finally, that from 19 to B the purple should be used for control with the red coordinates employed for indication.

There is illustrated in Figure 3 by means of a block diagram an apparatus for making the comparisons mentioned in the preceding paragraphs. The red phase meter 10 shown on the panel 1 in Figure 1 is mechanically coupled as indicated at 26 to a follower device 27 which operates to compete an electrical circuit whenever the red phase meter moves to a position different from that represented by the follower device.

The follower device is illustrated in Figure 4 as comprising a disc 28 of electrically conductive material mounted upon a shaft 29 which is journalled for rotation by any suitable means. At one point on the periphery of the disc 28 there is inset a segment 30 of insulating material adapted to be engaged by a wiper arm 31 carried upon a second shaft 32 also journalled by suitable means for rotation and electrically insulated from the disc 28.

The arm 31 is so arranged as to normally rest upon the insulating segment 30 so as to present an open circuit as between the wiper arm 31 and the disc 28. The shaft 32 comprises the mechanical coupling represented at 26 in Figure 3, so that upon movement of the red phase meter 10 a predetermined amount the wiper arm 31 will engage the disc 28 and establish an electrical circuit therebetween. This circuit may extend as indicated in Figure 3 at 33 through a relay contact 34 and by way of conductor 35 to a tape drive unit 36.

The tape drive unit 36 is mechanically coupled as indicated at 37 through a reverse gear 38, mechanical coupling 39 and change speed gear 40 to a shaft 41, the rotation of which is arranged to move a suitable recording medium.

In accordance with one form of the invention the recording medium may comprise a length of motion picture film such as is represented at 42 in Figure 6. This film is normally wound on a suitable reel 43 from which the film may pass over idlers 44 and 45 being engaged with a drive sprocket 46 connected to the shaft 41. From the idler 45, the film passes a reproducer indicated generally at 47 to an idler 48 from whence the film passes idlers 49 serving to maintain the film in engagement with the sprocket 46. The film end may be secured to a suitable take-up reel 50. As the shaft 41 is rotated the film 42 is caused to move past the reproducer 47.

The reproducer 47 may comprise a projection means 51 which may include a light source 52, condensing lens 53, and a slit-defining means 54 for directing onto the under side of the film 42 an intense narrow beam of light extending transversely of the length of the film. On the other side of the film 42 there are mounted a plurality of light sensitive devices 55 hereinafter referred to as pick units which may comprise photosensitive cells of the selenium or other suitable type. In Figures 7 and 8 there are illustrated six such pick-up units, one for each of six channels of recording carried on the film 42 shown in Figure 6 and identified therein by reference characters 56, 57, 58, 59, 60 and 61. These channels constitute recordings of the values of parameters dealing with the intended journey or planned course.

The channel 56 is employed to control the sensitivity of the indication given; the channel 57 bears information relation to the terrain over which the intended track lies; channel 58 carries information pertaining to the scheduled time; and channels 59, 60 and 61 carry information relating respectively to the red, green and purple coordinate values along the intended course. Each channel comprises a narrow transparent section such as is shown at 62 in an otherwise opaque background. The narrow channel 62 is representative of the normal condition. A change in one direction is represented by a short opaque section such as is shown at 63, while a change in the opposite sense is represented by a short section of increased channel width as is shown at 64.

Assuming a portion of normal width 62 to be under one of the pick-up units 55 it will be seen that the change in output of the pick-up unit will be in one direction upon an opaque portion 63 coming into register therewith whereas the change in output will be of the opposite polarity whenever a portion 64 of increased width comes into alignment with the pick-up unit.

When the red phasemeter 10 moves sufficiently to complete a circuit between the wiper arm 31 and disc 28 of the follower 27 the control impulse transmitted from conductors 33 and 35 will actuate the tape drive 36 in such wise as to cause the film 42 to start moving past the reproducer. In the assumed case (where the red pattern is being used for control) this will move the film 42 a distance sufficient to produce on the pick-up unit 55 associated with the red channel (red pick-up 65 Figure 3) a single impulse which may be considered as having a forward polarity. This impulse is passed along conductors 66 and 67 through a relay contact 68 and conductor 69 to a drive unit 70 which is mechanically coupled as indicated at 71 to the follower 27. The mechanical coupling indicated at 71 comprises the aforementioned shaft 29. The drive unit 70 is preferably of the ratchet type so that upon receiving the impulse from conductor 69 the drive unit 70 rotates the disc 28 in the same direction as the wiper arm 31 was rotated by the red phase meter and in an amount sufficient to again place the wiper arm 31 and disc 28 in the previously mentioned relative positions in which the wiper arm 31 is resting on the insulating segment 30. The resulting interruption of the control circuit at the wiper arm 31 deenergizes the drive means 36 and stops the motion of the film 42.

The net effect has thus been to advance the film 42 from one recording in the channel 59 to the next and to re-establish at the follower 27 the original operating conditions. As the red phase meter 10 continues to move as a result of the movement of the aircraft the film 42 will be periodically moved past the reproducer 47 and the red pick-up unit 65 will in response thereto so operate the drive 70 to cause the follower 27 to follow the movements of the red phase meter. It is thus seen that the film 42 is caused to move past the reproducer 47 in synchronism with the movement of the aircraft with respect to the red pattern.

The red pattern which is shown in Figure 2 has, for the purpose of simplification, been drawn as a relatively coarse pattern. It will be understood that in operation the sensitivity of the follower device 27 is so adjusted that the red coordinate line intersection 20, 21, 22 etc. are crossed at frequent intervals as, for example, every hundred yards of travel of the aircraft. Thus, while the motion of the film 42 is in fact intermittent the individual incremental movements occur so frequently that the follower may be said to move continuously at a rate which is representative of the rate at which the aircraft crosses the red coordinate lines. By adjusting the longitudinal spacing between successive recordings in the channel used for control to correspond to the variable spacing between the associated coordinate lines, the movement of the film 42 may be made to correspond exactly to the motion of the aircraft with respect to the ground surface.

As the aircraft proceeds generally in the direction of the intended course 16 the green phase meter 11 will rotate in accordance with the changing value of the green co-ordinate. The green phase meter 11 is coupled as indicated at 72 to a follower device 73 which is identical to the follower 27 hereinbefore described. In order to preserve the sense of the motion of the green phase meter, the insulating segment 30 is preferably extended diametrically across the disc 28 as is shown in Figure 3 to divide the disc into two electrically separate halves respectively associated with the forward and reverse movements of the phase meter. The control impulse produced by the follower 73 is carried on conductors 74 and 75 to a ratchet drive unit 76 which is arranged to rotate a shaft 77 through a prededetermined angular increment in the corresponding direction for each impulse delivered to the drive unit 76. In addition, the drive unit 76 produces in response to its actuation a control impulse which is passed by way of conductor 78, relay contact 79 and conductor 80 to another ratchet drive 81 which is coupled as shown at 82 to the other shaft of the follower 73. Thus, as the green phase meter 11 moves in response to the changing value of the green coordinate the follower 73 is caused to keep pace therewith and the shaft 77 of the ratchet drive 76 is caused to assume an angular position corresponding to the green coordinate value indicated by the phase meter 11.

That one of the pick-up units 55 which is associated with the green track 60 of the film 42 is identified by the reference character 83 in Figure 3. This pick-up unit is coupled as shown at 84 to a ratchet drive 85 which is arranged to rotate a shaft 86 through a predetermined angular increment each time an impulse is delivered from the green pick-up 83. The impulses produced by the green pick-up 83 depend upon the recordings carried by the green channel 60 of the film 42. These recordings correspond to the changing values of the green coordinate as track 16 passes the red coordinate intersections 20, 21, 22, etc. The ratchet drive 85, as well as the other ratchet drives hereinbefore and hereinafter mentioned, are preferably of the well known double magnet and pawl or polarized type so that the direction of shaft rotation corresponds to the identity or polarity of the driving pulse. The shaft 86 is thus caused to assume an angular position representative of the green coordinate value that should obtain at that given instant were the aircraft on the intended track. At the same time the shaft 77 is caused to occupy an angular position which is representative at that same instant of the actual position of the aircraft with respect to the green coordinate pattern. The shafts 77 and 86 are coupled to a comparator device 87 which operates to produce an indicating potential representative of the sense and magnitude of the difference between the actual and intended values of the green coordinate.

The comparator device 87 is illustrated diagrammatically in Figure 5. The shaft 86 is secured to a disc 88 of insulating material upon which is mounted a resistance strip 89. The resistance strip 89 cooperates with a wiper arm 90 which is secured to the shaft 77. The ohmic value of the resistance included between the wiper arm 90 and one terminal of the resistance strip 89 is thus representative of the relation between the actual position of the aircraft with respect to the green coordinate pattern and the position in that pattern the aircraft should occupy if it were on the intended course. This resistance comprises a part of Wheatstone bridge circuit 91, being connected thereto through conductor 92, relay contact 93 and conductor 94.

It will be understood that three legs of the bridge circuit are fixed and that the comparator 87 comprises the variable resistance leg of the circuit. The value of the resistances are so selected that the bridge is balanced when the actual and planned values of the green coordinate are identical. The track or course indicator 2 is connected as shown at 95 as the balance-responsive device of the bridge circuit. If at a given instant the green coordinate of the aircraft's position is greater than it should be, the indicator will be displaced in one direction from its neutral position. Conversely, if the actual measured value is less than planned, the indicator will be displaced in the opposite direction. The sense of the indication is so selected as to give the pilot of the aircraft a direct indication as to whether his actual position is to the right or to the left of the intended course.

Summarising the foregoing, it will be seen that by virtue of the control connections between the red phase meter 10 and the tape drive means 36 the tape or film 42 is caused to move in correspondence with the motion of the aircraft with respect to the red navigational pattern. At the same time the variable resistance comprising the comparator 87 is caused to vary in accordance with the variations in the differences between the actual and intended values of the green coordinate corresponding respectively to each of the positions of the film 42 as it moves in correspondence with the motion of the aircraft. Deviations of the aircraft from the intended course are thus indicated on the track or course indicator 2.

By having reference to Figure 2 it may be seen that because of the hyperbolic character of the navigational pattern, the accuracy of indication afforded in the portion 18—19 of the course is considerably higher than that which is obtained at greater distances from the transmitters; for example, near the destination B. It is intended that the course indicator 2 indicate the actual magnitude of the deviation of the aircraft from its intended course. Since the sensitivity of the navigational pattern varies along the course it is desirable to vary compensatorily the sensitivity of the bridge circuit 91 so that a given deflection of the course indicator 2 will always represent a given absolute distance of departure of the aircraft from the intended course. To this end the channel 56 of the film 42 is provided with information representative of the sensitivity of indication afforded by the navigational system. This information is picked up by a sensitivity pick-up 96 comprising one of the units 55 shown in Figure 7. Control impulses periodically produced as a result of the motion of film 42 past the pick-up 96 are conveyed by conductor 97 to a ratchet drive unit 98 which is coupled as indicated at 99 to a sensitivity control 100 coupled as shown at 101 to the bridge circuit 91. The sensitivity control 100 may comprise, for example, a variable resistance in circuit with the supply voltage for energising the bridge so that the sensitivity of indication given by the course indicator 2 may be increased by increasing the voltage across the bridge terminals.

Equipment identical with that thus far described is also provided for the purple coordinate system, and provision is made for transferring control and indication among the three coordinate systems at the points 17, 18 and 19 as hereinbefore mentioned. This equipment may comprise a tape footage counter 102 which for convenience may be connected directly to the shaft 41 of the film or tape drive equipment, as for example, by a shaft 103. The tape footage counter is mechanically connected as shown at 103 to a preset contacting device 104. Adjustable contacts within the device 104 are coupled as indicated diagrammatically at 105 to a group of control relays RC, GC and PC and to a group of indicator relays RI, GI, and PI.

It will be understood that since the motion of the recording medium 42 is representative of the motion of the aircraft along the intended track 16, the points 17, 18 and 19 on that track correspond to points on the recording medium 42. Since the tape footage counter 102 registers the motion of the recording medium 42 and passes this information by way of the connection 103 to the preset contactor 104, the contactor 104 may have its contacts so preset as to cause the energising or de-energising of the control and indicator relays at the points 17, 18 and 19.

In accordance with the assumed problem represented in Figure 2, the apparatus is set initially to utilise the red coordinates for control and the green coordinates for indication. The various relay contacts shown on Figure 3 are shown in the positions occupied when the red control relay RC and the green indicator relay GI are energised and the remainder de-energised. When the aircraft arrives at point 17, the preset contactor will effect the energising of the purple control relay and the de-energising of the red control relay. This serves to open the red control relay contacts 34 and 68 and close the corresponding purple control contacts PC shown in Figure 3. Thereafter movements of the purple phase meter 12 will control the motion of the recording medium 42 whereas indication will continue to be based upon the green coordinate values. Similarly, the control transfer operations at points 18 and 19 serve to first shift control and indication to the red and green respectively and then to shift control and indication of the purple and red respectively.

The elevation information recorded on the elevation track 57 serves to actuate an elevation pick-up 106 which is coupled as shown at 107 to a ratchet drive 108. The ratchet drive 108 is connected to one shaft 109 of a differential gear 110, the other input shaft 111 of the differential gear being coupled to an altimeter 112. The third shaft 113 of the differential gear 110 is connected to the clearance indicator 7. The angular position of the shaft 109 is controlled by the elevation pick-up 106 and represents the elevation of the terrain over which the aircraft is passing. The angular position of the shaft 111 represents the altitude of the aircraft. The shaft 113 is moved by the differential gear to a position representing the difference between these two quantities and therefore represents the clearance distance between the aircraft and the terrain beneath.

In a similar way, the schedule indicator 9 is coupled as shown at 114 to the output shaft of a differential gear 115, one input 116 of the differential gear 115 being connected to a clock 117 or other suitable time keeping mechanism. A time pick-up 118 associated with the time or schedule track 58 on the recording medium 42 is connected as shown at 119 to a drive unit 120 which is coupled as shown at 131 to the other input shaft of the differential 115. The angular position of the shaft 116 is representative of the actual time elapsing since departure while the angular position of the shaft 121 is representative of the time which should have elapsed were the flight on schedule. The angular position of the shaft 114 represents the difference between the two times and so indicates on the schedule indicator 9 whether or not the flight is ahead or behind schedule and the amount of the difference.

Since the motion of the film or tape 42 is representative of the motion of the aircraft with respect to its intended course the distance the film moves is representative of the distance the aircraft moves. The tape footage counter 102 is coupled as shown at 122 to the distance indicator 5 which is preferably arranged to indicate the distance to destination. The tape footage counter 102 may also be coupled as shown at 123 to a differentiating mechanism 124, the output of which is connected as at 125 to the ground speed indicator 3. Since the motion of the recording medium is synchronised with the motion of the aircraft with respect to the intended track, the differentiating device 124 operates to measure the rate of travel of the recording medium 42. This rate of travel is directly proportional to the rate of travel of the aircraft with respect to the ground and so permits the indicator 3 to be calibrated directly in terms of ground speed.

The output from the tape footage counter 102 and the output from the differentiator 124 may be connected as shown to a dividing mechanism 127 operating to divide the distance to destination by the ground speed of the aircraft. The value of this quotient is representative of the time required to reach the destination and the output of the divider mechanism 127 is therefore coupled as shown at 128 to the time to destination indicator 4. Since the product of rate of fuel consumption by time to destination is representative of the amount of fuel required to reach the destination, the output of the divider 27 is connected as shown at 129 to a multiplying device 130 to which is also connected as indicated at 131 a fuel flow meter 132. The resulting product is coupled as shown at 133 to the indicator 6.

The differentiator, divider, and multiplier device hereinbefore referred to may be of any suitable type, either mechanical or electrical. Such devices are well known in the art and form no part of the present invention which is concerned with utilising these known devices in the manner indicated to effect the indication of the parameters relating to the planned journey.

The preset contactor 104 also includes a set of contacts which are coupled as shown at 134 to the warning device 8 which may comprise a visual or aural signal, or both, as desired. The contacts of the preset contactor 104 associated with the warning device 8 are set at points along the movement of the recording medium 42 representing the approach of the aircraft to known hazards such as control towers, tall buildings, mountain peaks and the like. Warning device 8 thus serves to remind the pilot that he is approaching these known hazards.

In the operation of aircraft on scheduled flights, a traffic control problem often arises at the time of the arrival of the aircraft at its intended destination, often necessitating that the aircraft orbit about the airport until traffic conditions permit a landing and also requiring the aircraft to approach a given run-way, the selection of which depends upon the weather and traffic conditions. The track control unit herein described is also intended to assist the pilot of the aircraft in carrying out the manoeuvres required by the airport control officer. There is accordingly provided an orbit selector 135 which is coupled as shown at 136 to the preset contactor 104, and, as shown at 137, to change speed gear 40. The preset contactor 104 includes also two sets of contacts, one of which is connected as shown at 138 to the reverse gear 30, and the other of which is connected as shown at 139 to the change speed gear 40. The orbit selector comprises a selecting mechanism intended for manual control.

The operation of the device may best be understood by assuming a set of hypothetical instructions received by the pilot of the aircraft from the airport control officer. Assuming that upon arrival at the destination B, the pilot is instructed to fly an orbit which may be idenified by a suitable identifying number, the pilot depresses a correspondingly marked switch upon the orbit selector 135. This operates the change speed gear mechanism 40 by reason of the control connection 137 to cause the recording medium 42 to advance at high speed toward the end thereof. At the same time the control connection 136 effects the selection of the preset contactor contacts associated with control lines 138 and 139 so that when the recording medium 42 is moved to the beginning of the portion bearing that recording associated with the orbit selected, the change speed gear 40 will be restored to the normal drive ratio. As the aircraft proceeds around the orbit the device operates in the manner hereinbefore described to apprise the pilot of his position with respect to the selected orbit. Upon completion of a single full revolution of the orbit, the preset contactor operates the reverse gear through the control connection 138 to reverse the film drive and bring the recording medium 42 to a point coincident with the start of the orbit at that time. Another contact associated with the control connection 138 disengages the reverse gear and reinstates the normal mode of operation. Upon receiving instructions to land and learning the identity of the runway approach to be used the pilot may depress the corresponding switch in the orbit selector 135 and so shift the operation of the track control unit to that portion of the recording medium 42 upon which is recorded the data relating to the selected approach course.

There is shown in Figures 9, 10 and 11 a modified form of recording medium and reproducer which may be used in lieu of the recording medium and apparatus shown in Figures 6, 7 and 8. The recording medium in Figure 9 preferably comprises a tape or strip of paper or other suitably flexible and light weight insulating material. This tape, like the tape 42 shown in Figure 6, is provided with six channels of recording, each channel comprising a double row of perforations, perforations in one row being associated with positive values and the perforations in the other row being associated with negative values. The pick-up apparatus shown in Figure 11 is substantially the same as that shown in Figures 7 and 8 except that in place of the light source and photo-sensitive means, there is provided a plurality of spring contact fingers 140, one for each of the rows of perforations on the recording medium and each positioned to engage a contact anvil 141 whenever a perforation registers with the end of a contact finger 140.

It is often desirable, particularly in the case of aircraft, to indicate at a fixed location such as the airport of departure or arrival the progress of the aircraft along the planned course. There is shown diagrammatically in Figure 12 an apparatus for use with the hereinbefore described track control unit which serves to continuously indicate at a fixed ground station the progress of the aircraft. The apparatus shown in Figure 12 comprises a transmitter 142 mounted in the aircraft and coupled to a suitable transmitting antenna 143. The transmitter 142 is adapted to be keyed periodically by a keying device 144 to periodically transmit pulses of radio frequency energy. The keying device 144 is connected as shown at 145 to the previously mentioned distance indicator 5 in such manner as to key the transmitter 142 each time the aircraft traverses a given unit distance along the course, as for example, every mile. The signals thus radiated from the transmitting antenna 143 are received by a receiving antenna 146 located at the ground station and coupled to a suitable radio receiver 147. The radio receiver 147 is coupled as shown at 148 to a ratchet drive device 149 adapted to rotate a shaft 150 thereof through a given angular increment for each pulse received from the transmitter 142. The shaft 150 carries a drive sprocket 151 forming a part of a projection apparatus which may include the usual reels 152 and 153 for supporting a length of motion picture film, a light source 154 and a projection lens 155 adapted to project upon a screen 156 an image carried by a motion picture film 157 wound upon reels 152 and 153 and engaging the drive sprocket 151. The drive ratio is so arranged that each angular increment of the motion of the shaft 150 will advance the film 157 one frame. The film 157 has printed thereon a chart of the area over which the course of the aircraft extends, and on each frame there is indicated by means of a suitable index the location of the aircraft. It will be understood that the chart portion of the film image is identical from frame to frame but that the position of the aircraft index varies from frame to frame in accordance with the planned motion of the aircraft along its intended course.

As the aircraft proceeds along its intended course the film 157 is intermittently advanced so as to project on the screen 156 a new image each time the aircraft traverses a unit distance. In each of the successive images the index representative of the aircraft occurs at a new location corresponding to the unit progress of the aircraft so that there is visible upon the screen 156 a substantially continuous representation of the progress of the aircraft along its intended course.

From the foregoing it will be observed that there has been provided a track control unit for use with radio frequency navigational systems which operates to continually indicate the relation between the existing and planned parameters of a journey of a mobile vehicle such as a surface ship or aircraft. Attention is directed particularly to the fact that the information provided is not limited to the geographical parameters but includes also those other parameters an accurate knowledge of which constitutes a great aid to the safe and successful completion of a planned or scheduled trip. It will be understood that the recording medium 42 is prepared in advance and that preferably a library of such recordings is maintained, each different planned trip or schedule requiring a different recording. When the vehicle is being prepared for departure on a predetermined scheduled journey, the appropriate recording is selected from the library and installed in the apparatus. Thereafter the pilot or navigator of the vehicle is not concerned with any operation or adjustment of the track control unit as this device thereafter operates automatically to continually inform the pilot or navigator of the relation between his actual coordinates and those planned. Finally, the pilot or navigator may keep a continuous check upon the operation of the device by means of information given by the coordinate indicators 10, 11 and 12 and is thus able to ignore the indications of the track control unit and rely solely upon the coordinate indicators in the event of a mechanical failure.

While there has been shown and described the preferred embodiment of this invention, the same is not to be limited to the details of construction shown and described herein, except as defined in the appended claims.

We claim:

1. In a track control unit for use with a mobile vehicle carrying indicator means for indicating the instantaneous values of a plurality of parameters relating to the motion of said vehicle, the combination of: a recording medium having recorded thereon material representative of successive values of parameters relating to a planned journey of said vehicle; drive means coupled to one of said indicator means for moving said recording medium in correspondence with the changing value of a first parameter indicated by said one indicator means; a comparator for determining and indicating the difference between two input quantities; means coupling said comparator to another of said indicator means for applying to said comparator one input representative of the value of a second parameter indicated by said other of said indicator means; and reproducing means coacting with said recording medium and coupled to said comparator for applying to said comparator a second input representative of the planned value of said second parameter as represented by the material recorded on said recording medium.

2. In a track control unit for use with a mobile vehicle equipped with a radio navigational aid having a pair of cordinate position indicators, the combination of: a recording medium having recorded thereon material representative of successive values of position coordinates defining a planned journey of said vehicle; drive means coupled to one of said position indicators for moving said recording medium in correspondence with the changing values of a first coordinate indicated by said indicator; a comparator for determining and indicating the difference between two input quantities; means coupling said comparator to the other of said position indicators for applying to said comparator one input representative of the value of a second coordinate indicated by said other position indicator; and reprducing means coacting with said recording medium and coupled to said comparator for applying to said comparator a second input representative of the planned value of said second coordinate as represented by the material recorded on said recording medium.

3. In a track control unit for use with a mobile vehicle equipped with a radio navigational aid having a pair of coordinate position indicators, the combination of: a recording medium having recorded thereon material representative of successive values of position coordinates defining a planned journey of said vehicle; drive means coupled to one of said position indicators for moving said recording medium in correspondence with the changing values of a first coordinate indicated by said indicator; and registering means coupled to said drive means for registering and indicating the movement of said recording medium to thereby indicate the distance travelled by said vehicle with reference to said planned journey.

4. In a track control unit for use with a mobile vehicle equipped with a radio navigational aid having a pair of coordinate position indicators, the combination of: a recording medium having recorded thereon material representative of successive values of position cordinates defining a planned journey of said vehicle; drive means coupled to one of said position indicators for moving said recording medium in correspondence with the changing values of a first coordinate indicated by said indicator; registering means coupled to said drive means for registering and indicating the movement of said recording medium to thereby indicate the distance travelled by said vehicle with reference to said planned journey; transmitting means on said vehicle operable to transmit a signal to a fixed station; means coupled to said registering means for operating said transmitting means each unit of said distance travelled by said vehicle; receiving means at said fixed station for receiving said signals; indicating means at said fixed station operable to represent successive locations of said vehicle corresponding to each unit of said distance travelled by said vehicle; and means interconnecting said receiving means and said indicating means for operating said indicating means upon the reception of each of said signals.

5. In a track control unit for use with a mobile vehicle equipped with a radio navigational aid having a pair of coordinate position indicators; the combination of: a recording medium having recorded thereon material representative of successive values of position coordinates defining a planned journey of said vehicle; drive means coupled to one of said position indicators for moving said recording medium in correspondence with the changing values of a first coordinate indicated by said indicator; registering means coupled to said drive means for registering and indicating the movement of said recording medium to thereby indicate the distance travelled by said vehicle with reference to said planned journey; transmitting means on said vehicle operable to transmit a signal to a fixed station; means coupled to said registering means for operating said transmitting means each unit of said distance travelled by said vehicle; receiving means at said fixed station for receiving said signals; indicating means at said fixed station comprising a representation of the geographical area across which said planned journey extends and including an index moveable over said representation to successive positions corresponding to successive units of distance along said planned journey travelled by said vehicle; and drive means coupled to said receiving means for moving said index in synchronism with the reception of said signals.

6. In a track control unit for use with a mobile vehicle equipped with a radio navigational aid having a pair of coordinate position indicators, the combination of: a recording medium having recorded thereon material representative of successive values of position coordinates defining a planned journey of said vehicle; drive means coupled to one of said position indicators for moving said recording medium in correspondence with the changing values of a first coordinate indicated by said indicator; registering means coupled to said drive means for registering and indicating the movement of said recording medium to thereby indicate the distance travelled by said vehicle with reference to said planned journey; and differentiating means coupled to said registering means for indicating the rate at which said distance is travelled.

7. In a track control unit for use with a mobile vehicle equipped with a radio navigational aid having a pair of coordinate position indicators, the combination of: a recording medium having recorded thereon material representative of successive values of position coordinates defining a planned journey of said vehicle and having also recorded thereon material representative of the scheduled times corresponding to each of said values of position coordinates; drive means coupled to one of said position indicators for moving said recording medium in correspondence with the changing values of a first coordinate indicated by said indicator; a comparator for determining and indicating the difference between two input quantities; a time keeping device; means coupling said comparator to said time keeping device for applying to said comparator one input representative of the time duration of said journey; and reproducing means coacting with said recording medium and coupled to said comparator for applying to said comparator a second input representative of the scheduled time duration of said journey as represented by the material recorded on said recording medium.

8. In a track control unit for use with a mobile vehicle equipped with a radio navigational aid having a pair of coordinate position indicators, the combination of: a recording medium having recorded thereon material representative of successive values of position coordinates defining a planned journey of said vehicle; drive means coupled to one of said position indicators for moving said recording medium in correspondence with the changing values of a first coordinate indicated by said indicators; a comparator for determining and indicating the difference between two input quantities; means coupling said comparator to the other of said position indicators for applying to said comparator one input representative of the value of a second coordinate indicated by said other position indicator; reproducing means coacting with said recording medium and coupled to said comparator for applying to said comparator a second input representative of the planned value of said second coordinate as represented by the material recorded on said recording medium; and selector means under the control of an occupant of said vehicle and coupled to said drive means for moving said recording medium to a point corresponding to the operation of said selector means, said recording medium having recorded thereon material representative of successive values of position coordinates defining an alternative planned journey of said vehicle.

9. In a system for aiding the navigation of a mobile vehicle, the combination of: a fixed ground station radio transmission system including three spaced transmitters operating to radiate a master signal, a first slave signal, and a second slave signal, said signals being of harmonically related frequencies bearing a fixed multiple phase relation to each other; a mobile receiving apparatus carried by said mobile vehicle and including three separate receiving channels for simultaneously receiving said master and slave signals and including a phase comparator and indicator for indicating a first multiple phase relation between the received master signal and the received first slave signal and for indicating a second multiple phase relation between the received master signal and the received second slave signal; a recording medium on said mobile vehicle comprising an elongated record tape having a length which is proportional to the length of a planned journey and having a first recording thereon representative of successive values of said first phase relation, said recording being spaced along said tape in correspondence with the positions along said planned journey at which said first phase relations obtain, said tape also having recorded thereon a second recording representative of said second phase relations, said second recording being spaced along said tape in correspondence with the positions along said planned journey at which said second phase relations obtain; drive means for advancing said tape coupled to said phase comparator and indicator; a first pick-up for reproducing said first recording on said tape; means connecting said first pick-up to said drive means for controlling the operation of said drive means to move said tape in correspondence with the motion of said vehicle from one of said positions at which said first phase relation obtains to the next; a second pick-up for reproducing said second set of recordings; a differential indicating device connected between said second pick-up and said phase comparator indicator for indicating the difference between the recorded value of said second phase relation and the value indicated by said phase comparator and indicator; and registering means coupled to said drive means for registering and indicating the movement of said recording medium to thereby indicate the distance traveled by said vehicle with reference to said planned journey.

EDWARD FENNESSY.
GRAHAM E. ROBERTS.
RAYMOND CALVERT.

REFERENCES CITED

The following references are of record in the file of this patent:

UNITED STATES PATENTS

| Number | Name | Date |
|---|---|---|
| 2,027,527 | Hammond | Jan. 14, 1936 |
| 2,198,113 | Holmes | Apr. 23, 1940 |
| 2,261,252 | Hawk | Nov. 4, 1941 |
| 2,341,287 | Pookhir et al. | Feb. 8, 1944 |
| 2,362,827 | Joachim | Nov. 14, 1944 |
| 2,405,231 | Newhouse | Aug. 6, 1946 |
| 2,411,494 | Bliss | Nov. 19, 1946 |
| 2,423,337 | Moseley | July 1, 1947 |
| 2,428,427 | Loughren | Oct. 7, 1947 |
| 2,432,158 | Hulst | Dec. 9, 1947 |
| 2,444,933 | Jasperson | July 13, 1948 |
| 2,480,152 | Mandel | Aug. 30, 1949 |
| 2,526,682 | Mulberger et al. | Oct. 24, 1950 |
| 2,527,548 | Hastings | Oct. 31, 1950 |